United States Patent Office 3,636,022
Patented Jan. 18, 1972

3,636,022
NICKEL AMIDE COMPLEXES OF BISPHENOL SULFIDES
John Harvey Bright, Middlesex, N.J., assignor to American Cyanamid Company, Stamford, Conn.
No Drawing. Filed Apr. 9, 1969, Ser. No. 814,805
Int. Cl. C07f 15/04; C08f 45/62
U.S. Cl. 260—439 R                        6 Claims

ABSTRACT OF THE DISCLOSURE

Nickel amide complexes of 2,2'-thiobis(p-alkylphenols) are provided. The complexes are prepared by the reaction of a 1:1 nickel aquo complex of a 2,2'-thiobis(p-alkylphenol) with an amide. The invention also provides stable polyolefin compositions containing said nickel amide complexes or a mixture of an amide and the aforementioned nickel aquo complex of 2,2'-thiobis(p-alkylphenol).

---

This invention relates to new nickel amide complexes of thiobis phenols and to their use as light stabilizers for polyolefins. More particularly, it relates to nickel amide complexes of 2,2'-thiobis(p-alkylphenols) especially 2,2'-thiobis(p-t-octylphenol), and to their use as light stabilizers for polyolefins.

U.S. Pat. 3,215,717 issued Nov. 2, 1965 discloses 1:1 nickel amine complexes of phenol sulfides as UV absorbers for polyolefins. U.S. Pat. 3,313,770 issued Apr. 11, 1967 discloses polymeric compositions containing these nickel amine complexes.

The above nickel amine complexes, although effective as light stabilizers in polyolefins, impart an undesirable level of color to processed polypropylene in which they are present as light stabilizers. Since the level of light stability provided by the nickel complexes is quite high, it is an object of this invention to provide nickel complexes which retain the same degree of effectiveness without the disadvantage of imparting color to the stabilized polymers in which they are incorporated. Other objects of this invention will be apparent from the ensuing description thereof.

The present invention is based on the discovery of a class of 1:1 nickel amide complexes with 2,2'-thiobis(p-alkylphenols) which are useful as light stabilizers in polyolefin compositions. In another aspect, the present invention is based on the discovery that a mixture of an amide and the nickel aquo complex of the 2,2'-thiobis(p-alkylphenol) is also capable of acting as an effective light stabilizer for polyolefins.

The new compounds of the present invention are not mixtures of the amides and nickel thiobis-phenols, but discrete nickel amide complexes having the components in a definite ratio of 1:1. The complexes are characterized by a single nickel to sulfur coordinate bond and a single nickel to oxygen coordinate bond, for each nickel atom in the complex molecule and are represented by the formula:

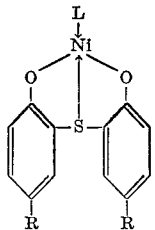

wherein each R is alkyl having from 1 to 18 carbon atoms and L is an amide complexed through its amide oxygen atom selected from the group set forth below. They are prepared by first forming the nickel (aquo) 2,2'-thiobis (p-alkylphenolate) by the reaction of equimolar quantities of a nickel salt (e.g., the hexaquo sulfate) in water with a solution (in a water-miscible polar solvent such as an alkanol) of disodium 2,2'-thiobis(p-alkylphenolate). The 2,2'-thiobis(p-alkylphenols) are well known compounds, and may easily be prepared by known means such as by reaction of a p-alkylphenol with $SCl_2$. Other water soluble salts of the phenol, e.g., the potassium salt can be used instead of the sodium salt. The nickel (aquo) 2,2'-thiobis(p-alkylphenolate) is then dissolved in an excess of dimethoxypropane (DMP) or other suitable solvent (e.g., toluene or acetone) or combination of solvents in which the starting material is dehydrated. Toluene is often used as a co-solvent to insure solution of the product complex. The solution is then stirred under anhydrous conditions for several hours and then an equimolar quantity of an amide is added as a solution in the same or similar solvent in which the aquo complex was dissolved. The solvent is then removed until the nickel amide complex product precipitates.

Examples of useful p-alkylphenolsulfides are: bis(p-t-octylphenol)sulfide, the preferred species, bis(p-t-butylphenol)sulfide, bis(p - cyclohexylphenol)sulfide, bis - p-nonylphenol)sulfide, bis(p - ethylphenol)sulfide, bis(p-amylphenol)sulfide, bis(p-t-dodecylphenol)sulfide and bis-(p-octadecylphenol)sulfide. In general, it will be observed any 2,2'-thiobis(p-alkylphenol) with an alkyl group of 1 to 18 carbons may be used.

A wide variety of amides can be employed to prepare the complexes of this invention. The only criterion for the amide in order to be useful herein is that it complex with the nickel phenolate through the amide oxygen atom.

Among the suitable classes of amides are those selected from the group consisting of nitrilotris(lower-alkanamides); N-mono- and N,N-di-alkyl-(including cycloalkyl)substituted amides of aliphatic $C_1$–$C_{18}$ acids; N,N'-alkylene-bis-alkaneamides and alkenamides; ureas, such as mono- and di-alkylureas; ethylene urea; and lower-alkyl substituted derivatives of phosphoric acid triamide. In the foregoing, alkyl (except lower-alkyl) and alkenyl may contain up to 18 carbon atoms. Such amides are typified by N,N-dimethylformamide, N,N-dimethylacetamide, N,N - dimethylstearamide, N,N' - methylene-bis-acrylamide, N-2-dodecylacrylamide, ethyleneurea, hexamethylphosphoric triamide, and nitrilotrispropionamide.

The new nickel amide complexes may be used for the stabilization of polyolefins at concentrations of from about 0.1 to 3.0%, by weight, preferably from about 0.2 to 1.5% based upon the weight of the polymeric substrate. They show superior stabilizing characteristics in various ways, especially in their thermal stability in polyolefins. They impart very little or no color to the compositions, have improved compatibility so that fairly high concentrations can be used without blooming, low volatility so that the agent is retained in the composition without loss, a high degree of light stability so that there is minimal loss due to deterioration of the agent and effectiveness in preventing or minimizing development of discoloration, brittleness, loss of tensile strength, etc.

The advantages of the new complexes of the invention are particularly apparent when they are used in the substrate in combination with other additives or secondary stabilizers. Suitable secondary stabilizers which can be employed include derivatives of thiopropionic acid such as dilaurylthiodipropionate, distearylthiodipropionate, ditridecylthiodipropionate and the like. Suitable organic phosphites which can be employed include didecylphosphite, diethylphosphite, dioctylphosphite, diphthalodecylphosphite, distearylpentaerythritoldiphosphite, trilauryltrithiophosphite and the like. Generally, these materials, if employed, are employed in concentrations of 0.1 to 1.0% based upon the weight of the polyolefin composition.

Additional ultraviolet light absorbers also can be employed. Any ultraviolet light absorber can be employed as long as it performs the functions generally required of an ultraviolet light absorber for polyolefins. These functions are well-known to be high absorbency in the region of about 300–400 millimicrons, low absorbency in the region above about 400 millimicrons, and solubility in and compatibility with polyolefins and stability to light and heat.

Examples of ultraviolet absorbers which may be used are as follows:

(A) 2-hydroxybenzophenones: 2-hydroxy-4-methoxybenzophenone, 2,4 - dihydroxybenzophenone, 2,2' - dihydroxy - 4 - methoxybenzophenone, 2,2',4,4'-tetrahydroxybenzophenone, 2,2'-dihydroxy - 4,4' - dimethoxybenzophenone, 2-hydroxy - 4 - butoxybenzophenone, 2-hydroxy-4-octyloxybenzophenone, 2-hydroxy-4-dodecyloxybenzophenone, 2,2'-dihydroxy-4-octyloxybenzophenone, 4'-chloro-2-hydroxy-4-octyloxybenzophenone, etc.

(B) Benzotriazoles: 2-(2-hydroxy - 5 - methylphenyl)-benzotriazole, 2-(2-hydroxy-5-octylphenyl)benzotriazole, 2-(2-hydroxy-4-methoxyphenyl)benzotriazole, etc.

(C) Esters: Phenyl salicylate, tertiary-butyl-phenyl salicylate, phenyl resorcylate, p-octylphenyl benzoate, bis-(p-nonylphenyl)isophthalate, bis(p - nonylphenyl)terephthalate, etc.

(D) Triazines: 2,4,6-tris(2-hydroxy-4-octayloxyphenyl)-s-triazine, 2-(2 - hydroxy - 4 - octyloxyphenyl)-4,6-dixylyl-s-triazine, etc. These compounds are the subject of U.S. Pat. 3,118,887, issued Jan. 21, 1964, to Hardy et al.

(E) Benzothiazolines: 2 - (4 - methoxyphenylimino)-3-ethylbenzothiazoline, 2 - phenylimino - 3 - ethylbenzothiazoline, etc. These materials are disclosed in U.S. Pat. 2,393,801.

(F) Benzylidene-malonic esters: Diethyl p-methoxybenzylidenemalonate, diethyl o-methoxybenzylidenemalonate, diethyl p-hydroxybenzylidenemalonate, diethyl diphenylmethylenemalonate, etc. This class of ultraviolet absorbers is disclosed in copending application of Susi, Ser. No. 362,182 filed Apr. 23, 1964.

(G) Arylaminoethylenes: N-methyl-p-methoxyanilinomethylenemalononitriles disclosed in U.S. Pat. 3,079,366.

(H) Guanidines of the 1,2-dibenzoyl-3-arylguanidine class: (disclosed in application Ser. No. 386,386 filed July 30, 1964) as exemplified by 1,2-dibenzoyl-3-(p-methoxyphenyl)guanidine, 1,2 - dibenzoyl - 3 - (p-chlorophenyl)-guanidine, 1,2-di-(p-methoxybenzoyl)-3-(p-methoxyphenyl)guanidine, and the like.

(I) Aryl acrylonitrile and arylacrylic acid derivatives such as: Diphenylmethylenecyanoacetic acid ethyl ester; diphenylmethylenecyanoacetic acid octyl ester and diphenylmethylenemalononitrile. These are disclosed in U.S. Pat. 3,111,417, 3,149,146 and 3,085,097.

As noted above, a high degree of light stability is achieved when the nickel aquo complex and one of the above described amides are incorporated in the same proportions in "uncomplexed" form (i.e., as a mixture or as separately added components) into the polyolefin substrate.

The effectiveness of the complexes in polymers of alpha olefins of 2–4 carbons may be evaluated in a number of ways. Thus, the agent may be incorporated in a polyolefin composition which may then be exposed in the Fade-O-Meter and observed for development of color, brittleness, etc.; or the degree of deterioration on a fixed period of exposure may be determined using the number of hours exposure for induction period before development of an appreciable amount of carbonyl (by extrapolation to zero), the carbonyl formation indicating breakdown. Other suitable methods of evaluation, such as described below, may also be used to evaluate the new complexes of the invention.

The invention is further illustrated by the examples which follow.

EXAMPLE 1

Nickel N,N-dimethylformamide complex of 2,2'-thiobis (p-t-octylphenol)

Nickel 2,2'-thiobis (p-t-octylphenolate, (5 grams, 0.01 mole), was dissolved in a mixture of 60 ml. of dimethoxypropane (DMP) and 10 ml. of toluene. The solution was stirred at room temperature overnight under a drying tube, allowing time for removal of complexed water. The solution was filtered to remove traces of insoluble material. To this solution was added 10 ml. of N,N-dimethylformamide. The solvent was removed by distillation under vacuum. A tacky solid residue was obtained which was dried in a vacuum at 60° C. for several days. The compound slowly decomposes above 220° C. The analysis and infrared spectrum were consistent with the formula for the 1:1 complex $C_{13}H_{47}NO_3SNi$.

EXAMPLE 2

Nickel N,N-dimethylstearamide complex of 2,2'-thiobis (p-t-octylphenol)

Nickel 2,2'-thiobis (p-t-octylphenolate), (7.6 grams, 0.015 mole), was dissolved in 100 ml. of warm DMP. The dark green solution was stirred for several hours under a drying tube and then filtered to remove insoluble traces. To this solution was added a solution of 5.4 grams (0.015 mole) of N,N-dimethylstearamide in 20 ml. of DMP. The mixture which formed was stirred for several hours and then the solvent removed under vacuum. A green, molten mass remained which solidified into crystals, M.P. 40.5–43° C. The analysis and infrared spectrum were consistent with the formula for the 1:1 complex $C_{45}H_{75}NO_3SNi$.

EXAMPLE 3

Nickel N,N'-methylenebisacrylamide complex of 2,2'-thiobis (p-t-octylphenol)

N,N'-methylenebisacrylamide (2.3 grams, 0.014 mole), in 50 ml. of methanol, 50 ml. of dry acetone, and 5 ml. of DMP was added to 7.7 grams (0.015 mole) of nickel 2,2'-thiobis (p-t-octylphenolate) which had been stirred for 6 hours in 50 ml. of DMP. The solution was heated to reflux and filtered. The filtrate was warmed overnight with stirring. A precipitate formed which was filtered off and dried in a vacuum oven. The filtrate gave another precipitate on further concentration, and this precipitate was filtered. The third filtrate was evaporated to dryness, yielding a solid residue which was consistent with the formula for the 1:1 complex, $C_{35}H_{50}N_2O_4SNi$, according to elemental analysis and infrared spectrum.

EXAMPLE 4

Nickel N-(2-dodecyl)acrylamide complex of 2,2-thiobis (p-t-octylphenol)

Nickel 2,2'-thiobis (p-t-octylphenolate) (7.7 grams, 0.015 mole) was dissolved in 50 ml. of DMP and stirred for above 70 hours at 35° C. To this solution was added a heated solution of 3.6 grams (0.015 mole) of N-(2-dodecyl)acrylamide in 20 ml. of DMP and 30 ml. of toluene. The resulting solution was stirred overnight at room temperature. Most of the solvent was distilled off and the resulting sludge dried in a vacuum oven at 65° C. The glassy product was ground and redried. The analysis and infrared spectrum were consistent with the 1:1 nickel complex, $C_{43}H_{69}NO_3SNi$.

EXAMPLE 5

Nickel ethylene urea complex of 2,2'-thiobis (p-t-octylphenol)

Nickel 2,2'-thiobis(p-t-octylphenolate), (7.7 grams, 0.015 mole), was dissolved in 50 ml. of DMP and stirred at 40° C. overnight, to dehydrate the nickel complex. To this solution was added a solution of ethylene urea, (1.3 grams, 0.015 mole), in 20 ml. of DMP and 20 ml. of methanol. About 80 ml. of the solvent was then distilled leaving a thick green reaction mixture which was filtered. The product was dried in a vacuum oven at 70° C. The 1:1 nickel complex, $C_{31}H_{46}N_2SO_3Ni$ was confirmed by elemental analysis and infrared spectrum.

EXAMPLE 6

Nickel hexamethylphosphortriamide complex of 2,2'-thiobis(p-t-octylphenol)

Nickel 2,2'-thiobis(p-t-octylphenolate), (7.7 grams, 0.015 mole), was dissolved in 70 ml. of DMP and stirred overnight to dehydrate the nickel complex. The solution was filtered to remove traces of insoluble material. To this solution was added a solution of 2.7 grams (0.015 mole) of hexamethylphosphortriamide in 10 ml. of DMP. All of the solvent was then removed and the green product dried in a vacuum oven at 60° C. The 1:1 complex was confirmed by elemental analysis and infrared spectrum as $PSO_3N_3C_{34}H_{58}Ni$; M.P. 126–130° C.

EXAMPLE 7

Melt index aging

The complexes prepared above were evaluated in the following manner:

Test procedure

A master-mix of polypropylene containing 0.5% by weight of 2-hydroxy-4-octyloxybenzophenone and 0.25% by weight of dilaurylthiodipropionate was prepared by dry blending the additives (complexes) into the polymer. Individual samples into which 0.75% by weight of nickel complex was dry blended, were then milled on a standard two-roll plastic mill and strips were cut therefrom. The strips were inserted into a Melt Index Apparatus and the extrudate removed after five minutes was observed for color. Temperatures of 275° C. and 296° C. were employed for preparing the extrudates.

EXAMPLE 8

Polypropylene strips were prepared by the procedure of Example 7 and tested for light stability. The results are presented in the following table.

LIGHT EXPOSURE TESTS

Brittle point for 4–5 mil polypropylene films (hours)

| Complex[1] | Sunshire Arc Weather-O-Meter | Xenon Weather-O-Meter |
|---|---|---|
| A | 1,500 | >3,200 |
| B | 1,420 | 2,900 |
| C | 1,350 | 2,500 |
| D | >1,200 | 2,000 |
| E | >1,200 | >2,000 |
| F | 1,420 | 3,200 |
| G | 1,350 | 2,650 |

[1] Letter designations are same as in preceding table.

EXAMPLE 9

The foregoing procedure was used to prepare polypropylene samples with a mixture of the nickel aquo complex and an amide in accordance with this invention. Three extrudates were molded into thin films (4–5 mils) and exposed to light. The polypropylene contained 0.25% STDP (stearyl thiodipropionate), 0.10% pentaerythrityl tetrakis 3 - (3,5-di-t-butyl-4-hydroxyphenyl)priopionate, and 0.50% 2-hydroxy-4-octyloxybenzophenone.

| Sample description | Melt index aging (290° C.) | | Color rating[1] |
|---|---|---|---|
| | 5 min. | 10 min. | |
| 1.0% nickel aquo complex | Gray green. | Gray | 7 |
| 1:1 molar mixture of nickel aquo complex and N,N'-methylenebis(acrylamide)-1.0%. | Yellow green. | Yellow green. | 3 |

[1] Color scale 0–10.

EXAMPLE 10

Following the procedure of Example 9, polypropylene was tested for heat stability with the stabilizer of this invention. The polypropylene was free of any other stabilizer. The results are presented in the following table.

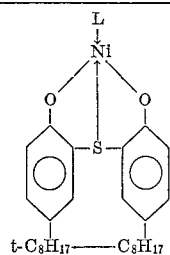

| | | | Color | |
|---|---|---|---|---|
| | | Aging for 5 minutes | | Color rating[2] aged at 296° C. (color scale 0-10) |
| Complex | L | 275° C. | 296° C. | |
| A | N,N-dimethylformamide | Yellowish-green | Yellowish-gray | 6 |
| B | N,N-dimethylstearamide | Light green | Light gray | 4 |
| C | N,N'-methylene-bis acrylamide | Light | Light green | 2 |
| D | N-2-dodecylacrylamide | do | do | 3 |
| E | Ethylene urea | | Light gray-green | 4 |
| F | Hexamethylphostriamide | Light green | Grayish-green | 5 |
| G | n-Butylamine[1] (prior art) | Yellow-brown | Greenish-brown | 7 |

[1] Nickel butylamine complex of 2,2'-thiobis (4-t-octylphenol).
[2] Color ratings relative to this complex. (See U.S.P. 3,313,770; 3,215,717) Color rating: 0=colorless; 10=black.

The above data illustrate the improved thermal stability provided by the amide complexes of the invention relative to the above n-butylamine complex, the best of the previously known nickel amine complexes.

| Sample description | Melt index aging (290° C.) | | Color rating[1] |
|---|---|---|---|
| | 5 min. | 10 min. | |
| 1.0% nickel aquo complex | Green | Gray green. | |
| 1:1 molar mixture of nickel aquo complex and N,N'-methylenebis(acrylamide)-1.0%. | do | Green | |

[1] Color scale 0–10.

What is claimed is:

1. A nickel amide complex of a 2,2'-thiobis(p-alkylphenol) characterized by a formula:

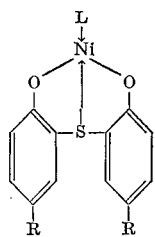

wherein each R is alkyl having from 1 to 18 carbon atoms and L is an amide complexed through the amide oxygen atom, selected from the group consisting of nitrilotris(lower-alkanamides); N-mono- and N,N-di-alkyl substituted amides of aliphatic $C_1$–$C_{18}$ acids; N,N'-alkylene bis alkanamides and alkenamides; di-alkyl-ureas; ethyleneurea; and lower-alkyl substituted derivatives of phosphoric acid triamide.

2. The nickel amide complex of claim 1 wherein the amide is N,N'-methylenebisacrylamide.

3. The nickel amide complex of claim 1 wherein the phenol is 2,2'-thiobis(p-t-octylphenol).

4. The nickel amide complex of claim 1 wherein the amide is N,N-dimethylformamide.

5. The nickel amide complex of claim 1 wherein the amide is N-(2-dodecyl)acrylamide.

6. The nickel amide complex of claim 1 wherein the amide is hexamethylphosphoric triamide.

References Cited

UNITED STATES PATENTS

| | | | |
|---|---|---|---|
| 2,894,933 | 7/1959 | Schweitzer | 260—45.9 |
| 2,912,411 | 11/1959 | Tamblyn et al. | 260—45.9 |
| 3,107,232 | 10/1963 | Matlack | 260—45.75 |
| 3,215,717 | 11/1965 | Foster | 260—439 |
| 3,418,271 | 12/1968 | Wagner et al. | 260—45.8 |

OTHER REFERENCES

Nardelli et al.: Chem. Abst., vol. 54 (1960), col. 1151.

JAMES E. POER, Primary Examiner

A. P. DEMERS, Assistant Examiner

U.S. Cl. X.R.

252—400, 401, 402, 403; 260—45.75 N, 309.7, 402.5, 429 D

Case 22,787

UNITED STATES PATENT OFFICE
CERTIFICATE OF CORRECTION

Patent No. 3,636,022            Dated January 18, 1972

Inventor(s) John Harvey Bright

It is certified that error appears in the above-identified patent and that said Letters Patent are hereby corrected as shown below:

Col. 2, line 23, "bis-p" should read -- bis(p --.

Col. 3, line 29, "octayloxyphenyl)" should read -- octyloxyphenyl --.

Col. 4, line 7, "octylphenolate, (5 grams, 0.01" should read -- octylphenolate), 5 grams, 0.01 --.

Col. 5, line 53, bottom of formula,

"$t\text{-}C_8H_{17} \longrightarrow C_8H_{17}$" should be

-- $t\text{-}C_8H_{17} \quad t\text{-}C_8H_{17}$ --

Col. 6, line 3, "Sunshire" should read -- Sunshine --.

Col. 6, line 8, ">2.000" should read -- >2,000 --.

Col. 6, lines 72 & 73, Last Table on page, Numbers -- 3 -- and -- 1 -- for last column are missing.

Col. 7, line 15, "the" should read -- an --.

Signed and sealed this 6th day of June 1972.

(SEAL)
Attest:

EDWARD M. FLETCHER, JR.
Attesting Officer

ROBERT GOTTSCHALK
Commissioner of Patents